United States Patent
Maeyama

(10) Patent No.: US 10,393,391 B2
(45) Date of Patent: Aug. 27, 2019

(54) REFRIGERATION CYCLE APPARATUS

(71) Applicant: Mitsubishi Electric Corporation, Tokyo (JP)

(72) Inventor: Hideaki Maeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 45 days.

(21) Appl. No.: 15/506,399

(22) PCT Filed: Oct. 16, 2014

(86) PCT No.: PCT/JP2014/077527
§ 371 (c)(1),
(2) Date: Feb. 24, 2017

(87) PCT Pub. No.: WO2016/059698
PCT Pub. Date: Apr. 21, 2016

(65) Prior Publication Data
US 2017/0328586 A1    Nov. 16, 2017

(51) Int. Cl.
*C09K 5/04* (2006.01)
*F24F 1/32* (2011.01)
(Continued)

(52) U.S. Cl.
CPC .................. *F24F 1/32* (2013.01); *C09K 5/04* (2013.01); *F24F 1/16* (2013.01); *F25B 1/00* (2013.01);
(Continued)

(58) Field of Classification Search
CPC .... C09K 5/04; C09K 5/045; C09K 2205/126; C09K 2205/22
See application file for complete search history.

(56) References Cited

U.S. PATENT DOCUMENTS

2010/0090156 A1    4/2010  Nappa et al.
2012/0132848 A1    5/2012  Sawada et al.
(Continued)

FOREIGN PATENT DOCUMENTS

EP    3109303 A1    12/2016
EP    3109304 A1    12/2016
(Continued)

OTHER PUBLICATIONS

The extended European search report regarding European patent application No. 14903899.4 dated Apr. 26, 2018.
(Continued)

*Primary Examiner* — John R Hardee
(74) *Attorney, Agent, or Firm* — Posz Law Group, PLC

(57) ABSTRACT

A refrigeration cycle apparatus includes refrigerant circuits in which a high pressure shell compressor, an outdoor heat exchanger, an expansion valve, and an indoor heat exchanger are connected; a mixed refrigerant made up of a mixture of 1,1,2-trifluoroethylene, difluoromethane, and 2,3, 3,3-tetrafluoropropene and configured to circulate through the refrigerant circuits, the mixed refrigerant containing less than 50 wt % of 1,2,2-trifluoroetylene and a mixing ratio of difluoromethane being between 0.7 times and two times (both inclusive) that of 1,2,2-trifluoroetylene in terms of weight ratio, in a state before the mixed refrigerant is enclosed in the refrigerant circuits; and a refrigerating machine oil enclosed in the refrigerant circuits and prepared such that difluoromethane is least soluble in the refrigerating machine oil.

16 Claims, 4 Drawing Sheets

(51) Int. Cl.
   *F25B 1/00*      (2006.01)
   *F24F 1/16*      (2011.01)
   *F25B 9/00*      (2006.01)
   *F25B 31/00*     (2006.01)
   *C10M 171/00*    (2006.01)
   *F04B 39/06*     (2006.01)

(52) U.S. Cl.
   CPC ............ *F25B 9/006* (2013.01); *F25B 31/004* (2013.01); *C09K 5/045* (2013.01); *C09K 2205/126* (2013.01); *C09K 2205/22* (2013.01); *C10M 171/008* (2013.01); *C10M 2207/2835* (2013.01); *C10M 2209/043* (2013.01); *C10M 2209/1033* (2013.01); *C10N 2240/30* (2013.01); *F04B 39/062* (2013.01)

(56) References Cited

U.S. PATENT DOCUMENTS

| | | |
|---|---|---|
| 2014/0070132 A1 | 3/2014 | Fukushima |
| 2014/0374647 A1 | 12/2014 | Saito et al. |
| 2015/0337191 A1 | 11/2015 | Fukushima |
| 2016/0075927 A1* | 3/2016 | Fukushima ............ C09K 5/045 252/68 |
| 2018/0057724 A1* | 3/2018 | Fukushima ............ C09K 5/045 |

FOREIGN PATENT DOCUMENTS

| | | |
|---|---|---|
| JP | 2008-531836 A | 8/2008 |
| JP | 2009-191212 A | 8/2009 |
| JP | 2009-298927 A | 12/2009 |
| JP | 2012-505296 A | 3/2012 |
| JP | 2012-131994 A | 7/2012 |
| WO | 2006/094303 A2 | 9/2006 |
| WO | 2012/157764 A1 | 11/2012 |
| WO | 2013/100100 A1 | 7/2013 |
| WO | 2014/123120 A1 | 8/2014 |
| WO | 2014/156743 A1 | 10/2014 |

OTHER PUBLICATIONS

Feiring et al., "Trifluoroethylene deflagration," Chemical & Engineering News, Dec. 22, 1997, vol. 75, No. 51, p. 6.
International Search Report of the International Searching Authority dated Jan. 20, 2015 for the corresponding international application No. PCT/JP2014/077527 (and English translation).

* cited by examiner

REFRIGERATION CYCLE APPARATUS

CROSS REFERENCE TO RELATED APPLICATION

This application is a U.S. national stage application of PCT/JP2014/077527 filed on Oct. 16, 2014, the contents of which are incorporated herein by reference.

TECHNICAL FIELD

The present invention relates to a refrigeration cycle apparatus.

BACKGROUND ART

In recent years, there has been demand to reduce greenhouse gasses from a perspective of preventing global warming. Regarding refrigerants used for refrigeration cycle apparatus such as air-conditioning apparatus, those with a lower global warming potential (GWP) are being considered. The GWP of R410A widely used for air-conditioning apparatus at present is as high as 2088. Difluoromethane (R32) that has begun to be introduced recently has a considerably high GWP value of 675.

Examples of refrigerant with a low GWP include carbon dioxide (R744: GWP=1), ammonia (R717: GWP=0), propane (R290: GWP=6), 2,3,3,3-tetrafluoropropenee (HFO-1234yf: GWP=4), and 1,3,3,3-tetrafluoropropenee (HFO-1234ze: GWP=6).

These low-GWP refrigerants are difficult to apply to typical air-conditioning apparatus because of the following problems.

R744: There is a problem in securing withstanding pressure because of very high operating pressure. Also, because critical temperature is as low as 31 degrees C., there is a problem of how to secure performance in application to air-conditioning apparatus.

R717: Because of high toxicity, there is a problem in ensuring safety.

R290: Because of high flammability, there is a problem in ensuring safety.

HFO-1234yf/HFO-1234ze: Because a volume flow rate increases at low operating pressure, there is a problem of performance deterioration due to increases in pressure loss.

A refrigerant capable of solving the above problems is 1,1,2-trifluoroethylene (HFO-1123) (see, for example, Patent Literature 1). The refrigerant has the following advantages, in particular.

Because of its high operating pressure and low volume flow rate, the refrigerant involves a reduced pressure loss and can readily ensure performance.

The refrigerant has a GWP of less than 1 and has an edge in countermeasures against global warming.

CITATION LIST

Patent Literature

Patent Literature 1: International Publication No. 2012/157764

Non-Patent Literature

Non-patent Literature 1: Andrew E. Feiring, Jon D. Hulburt, "Trifluoroethylene deflagration", Chemical & Engineering News (22 Dec. 1997) Vol. 75, No. 51, pp. 6

SUMMARY OF INVENTION

Technical Problem

HFO-1123 has the following problem.
(1) An explosion occurs if ignition energy is applied under high-temperature, high-pressure conditions (see, for example, Non-patent Literature 1).

To apply HFO-1123 to a refrigeration cycle apparatus, it is necessary to solve the above problem.

Regarding the above problem, it has become clear that an explosion will occur due to a chain of disproportionation reactions. This phenomenon will occur under the following two conditions.
(1a) Ignition energy (hot portion) is produced in the refrigeration cycle apparatus (especially, a compressor), causing disproportionation reaction.
(1b) Under high-temperature, high-pressure conditions, disproportionation reaction spreads in chains.

The present invention is intended to obtain a refrigeration cycle apparatus capable of inhibiting disproportionation reaction that uses HFO-1123.

Solution to Problem

A refrigeration cycle apparatus according to one embodiment of the present invention includes a refrigerant circuit in which a high pressure shell compressor, a condenser, an expansion mechanism and an evaporator are connected; a mixed refrigerant circulating through the refrigerant circuit and containing 1,1,2-trifluoroethylene, difluoromethane and 2,3,3,3-tetrafluoropropene mixed with each other, wherein, in a state prior to introduction of the mixed refrigerant into the refrigerant circuit, a mixing ratio of 1,2,2-trifluoroetylene is less than 50 wt % and a mixing ratio of difluoromethane is 0.7 times a mixing ratio of 1,2,2-trifluoroetylene or larger, but not more than two times of the mixing ratio of 1,2,2-trifluoroetylene in terms of weight ratio; and a refrigerating machine oil enclosed in the refrigerant circuit and prepared such that the difluoromethane is least soluble therein, from among 1,1,2-trifluoroethylene, difluoromethane and 2,3,3,3-tetrafluoropropene.

Advantageous Effects of Invention

By using the mixed refrigerant containing less than 50 wt % of 1,1,2-trifluoroethylene in a state before the mixed refrigerant is enclosed in the refrigerant circuit, the refrigeration cycle apparatus according to one embodiment of the present invention keeps down an amount of 1,1,2-trifluoroethylene in the refrigerant circuit. This makes it possible to keep 1,1,2-trifluoroethylene from causing disproportionation reaction.

Also, the refrigeration cycle apparatus according to the present invention uses a refrigerating machine oil prepared such that difluoromethane will be least soluble in the refrigerating machine oil. This can keep a proportion of 1,1,2-trifluoroethylene in the mixed refrigerant from increasing even during operation of the refrigeration cycle apparatus. Thus, the refrigeration cycle apparatus according to the present invention can keep 1,1,2-trifluoroethylene from causing disproportionation reaction even during operation of the refrigeration cycle apparatus.

Also, in the mixed refrigerant used for the refrigeration cycle apparatus according to the present invention, the mixing ratio of difluoromethane is 0.7 times the mixing ratio of 1,2,2-trifluoroetylene or more, but not more than two times the mixing ratio of 1,2,2-trifluoroetylene in terms of weight ratio. Consequently, 1,1,2-trifluoroethylene and difluoromethane can be brought into a pseudo-azeotropic state. Thus, the refrigeration cycle apparatus according to the present invention can inhibit separation between 1,1,2-trifluoroethylene and difluoromethane, and thereby further keep 1,1,2-trifluoroethylene from causing disproportionation reaction.

Also, to reduce a proportion of 1,1,2-trifluoroethylene in the mixed refrigerant, the refrigeration cycle apparatus according to the present invention mixes not only difluoromethane, but also 2,3,3,3-tetrafluoropropenee. Thus, the present invention can reduce the GWP of mixed refrigerant as well.

DESCRIPTION OF EMBODIMENTS

Embodiment

Figure 1:
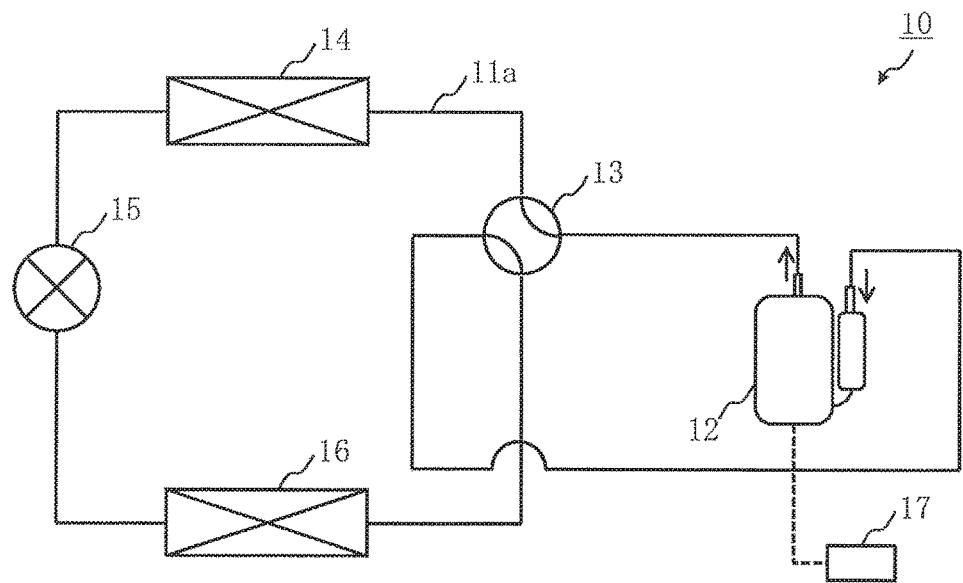
FIG. 1 is a circuit diagram of a refrigeration cycle apparatus 10 according to an embodiment of the present invention (during cooling).
Figure 2:
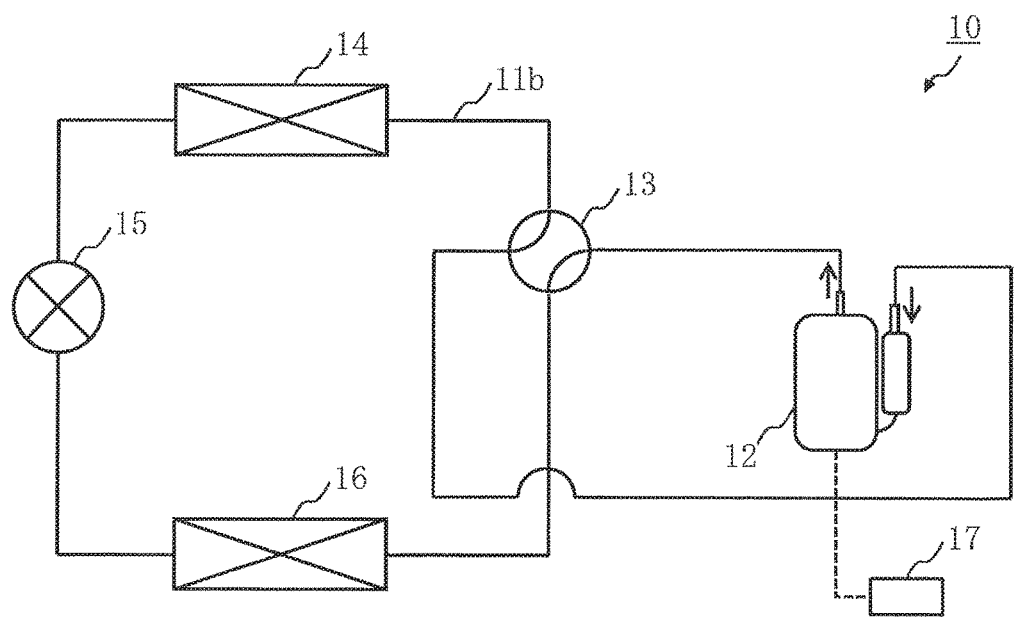
FIG. 2 is a circuit diagram of the refrigeration cycle apparatus 10 according to the embodiment of the present invention (during heating).

FIGS. 1 and 2 are circuit diagrams of a refrigeration cycle apparatus 10 according to an embodiment of the present invention, where FIG. 1 shows a refrigerant circuit 11a during cooling and FIG. 2 shows a refrigerant circuit 11b during heating.

According to the present embodiment, the refrigeration cycle apparatus 10 is an air-conditioning apparatus. Note that the present embodiment is also applicable when the refrigeration cycle apparatus 10 is other than an air-conditioning apparatus (e.g., a heat pump cycle apparatus).

In FIGS. 1 and 2, the refrigeration cycle apparatus 10 includes refrigerant circuits 11a and 11b through which refrigerant circulates.

The refrigerant circuits 11a and 11b are connected with a compressor 12 which is a high pressure shell compressor (compressor adapted to discharge the refrigerant compressed by a compression element into an airtight container), a four-way valve 13, an outdoor heat exchanger 14, an expansion valve 15, and an indoor heat exchanger 16. The compressor 12 compresses the refrigerant. The four-way valve 13 changes a flow direction of the refrigerant between cooling mode and heating mode. The outdoor heat exchanger 14 operates as a condenser during cooling and causes the refrigerant compressed by the compressor 12 to reject heat. The outdoor heat exchanger 14 operates as an evaporator during heating, and exchanges heat between outdoor air and the refrigerant expanded by the expansion valve 15 and thereby heats the refrigerant. The expansion valve 15 is an example of an expansion mechanism. The expansion valve 15 expands the refrigerant caused to reject heat by the condenser. The indoor heat exchanger 16 operates as a condenser during heating, and makes the refrigerant compressed by the compressor 12 to reject heat. The indoor heat exchanger 16 operates as an evaporator during cooling, and exchanges heat between indoor air and the refrigerant expanded by the expansion valve 15 and thereby heats the refrigerant. Note that when the refrigeration cycle apparatus 10 does only one of cooling and heating, the four-way valve 13 is not necessary.

The refrigeration cycle apparatus 10 further includes a controller 17.

The controller 17 is, for example, a microcomputer. Although only a connection between the controller 17 and compressor 12 is shown in FIGS. 1 and 2, the controller 17 is connected not only to the compressor 12, but also to various elements connected to the refrigerant circuits 11a and 11b. The controller 17 monitors states of the elements and controls the elements.

In the present embodiment, mixed refrigerant made up of a mixture of 1,1,2-trifluoroethylene (HFO-1123), difluoromethane (R32), and 2,3,3,3-tetrafluoropropenee (HFO-1234yf) is used as the refrigerant circulating through the refrigerant circuits 11a and 11 b (in other words, the refrigerant enclosed in the refrigerant circuits 11a and 11b). In a state before the mixed refrigerant is enclosed in the refrigerant circuits 11a and 11 b, the mixed refrigerant contains less than 50 wt % of HFO-1123 and a mixing ratio of R32 is between 0.7 times and two times (both inclusive) that of HFO-1123 in terms of weight ratio. As the mixing ratio of R32 is set between 0.7 times and two times (both inclusive) that of HFO-1123 in terms of weight ratio, the R32 and HFO-1123 are brought into a pseudo-azeotropic state (become pseudo-azeotropic refrigerants).

Also, in the refrigeration cycle apparatus 10 according to the present embodiment, refrigerating machine oil 60 is enclosed in the refrigerant circuits 11a and 11b. Most of the refrigerating machine oil 60 is accumulated at a bottom of an airtight container of the compressor 12 as described later. The refrigerating machine oil 60 has been prepared such that R32 will be least soluble of HFO-1123, R32, and HFO-1234yf therein. Furthermore, according to the present embodiment, the refrigerating machine oil 60 has been prepared such that HFO-1234yf will be more soluble therein than HFO-1123.

The refrigerating machine oil 60 used in the present embodiment, may be, for example, polyol ester. Polyol ester is a product of esterification of a fatty acid and polyhydric alcohol (polyol). Solubility (ease of dissolution) of the refrigerant in polyol ester can be prepared by adjusting a carbon number of the fatty acid, a molecular structure of the fatty acid (whether to use a branched-chain fatty acid or an unbranched (straight-chain) fatty acid), a carbon number of the polyhydric alcohol, and a molecular structure of the polyhydric alcohol (whether to use a branched-chain polyhydric alcohol or an unbranched (straight-chain) polyhydric alcohol).

Note that the refrigerating machine oil 60 used in the present embodiment is not limited to polyol ester, and polyvinyl ether or polyalkylene glycol may be used alternatively. Polyvinyl ether is a compound in which alkyl groups are linked to side chains of a straight-chain hydrocarbon via ether linkages. By varying components of the alkyl group linked to the side chains via ether linkages, the solubility (ease of dissolution) of the refrigerant in polyvinyl ether can be adjusted. Polyalkylene glycol is a compound in which a propylene oxide and ethylene oxide are linked together in chains via ether linkages. By varying a ratio between the propylene oxide and ethylene oxide the solubility (ease of dissolution) of the refrigerant in polyalkylene glycol can be adjusted.

Of course, the refrigerating machine oil 60 may be prepared by mixing at least two of polyol ester, polyvinyl ether, and polyalkylene glycol.

Also, regarding amounts of the mixed refrigerant and refrigerating machine oil 60 before enclosure in the refrigerant circuits 11a and 11b, the mixed refrigerant is set between one and four times (both inclusive) the refrigerating machine oil 60 in terms of weight ratio.

Figure 3:
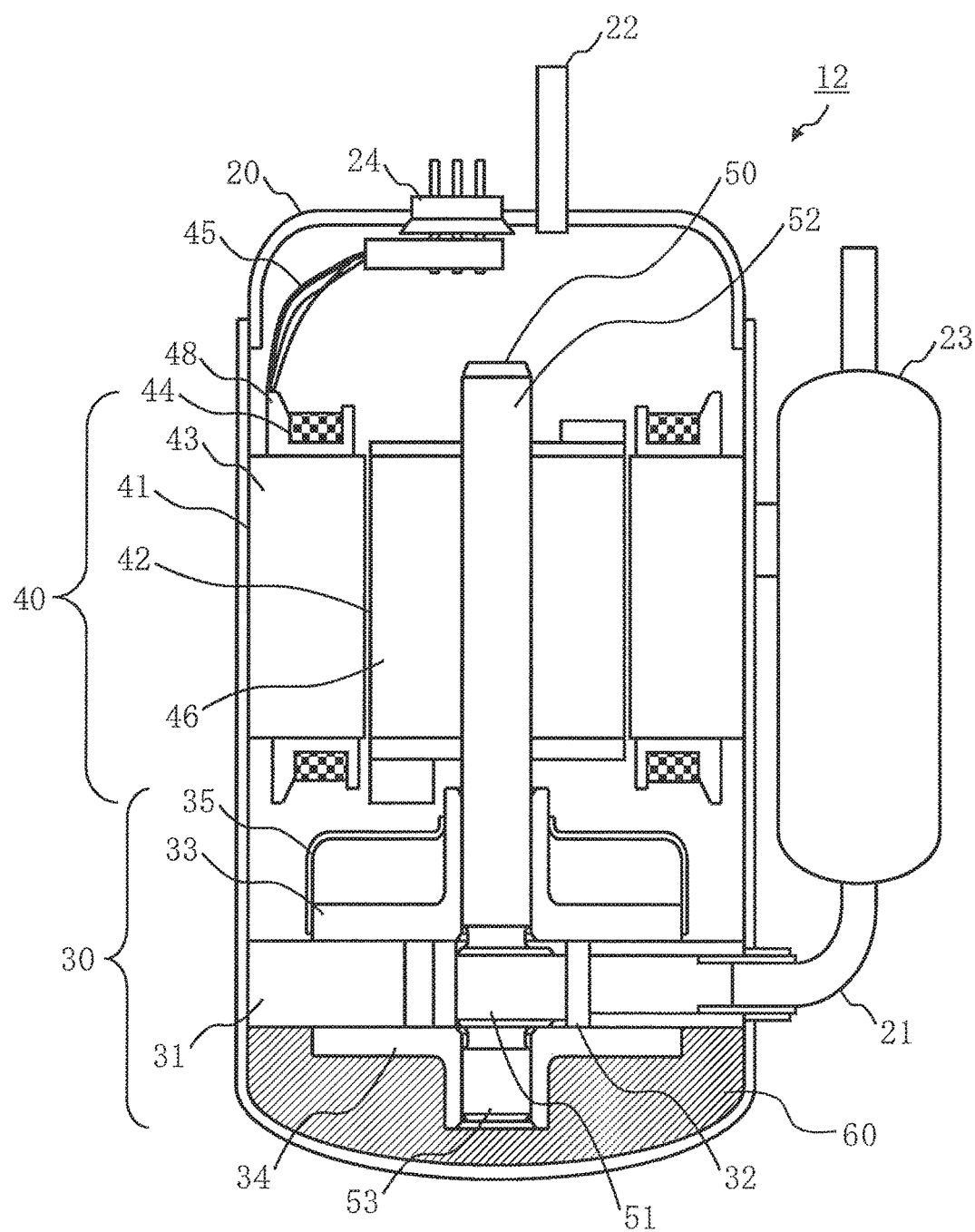
FIG. 3 is a longitudinal sectional view of a compressor 12 according to the embodiment of the present invention.

FIG. 3 is a longitudinal sectional view of the compressor 12 according to the embodiment of the present invention. Note that hatching used to indicate a section is omitted in FIG. 3.

According to the present embodiment, the compressor 12, which is a high pressure shell compressor (compressor adapted to discharge the refrigerant compressed by a compression element 30 into an airtight container 20), is a single-cylinder rotary compressor. Note that the present embodiment is also applicable even if the compressor 12 is a multi-cylinder rotary compressor or scroll compressor.

In FIG. 3, the compressor 12 includes an airtight container 20, a compression element 30, an electrically-operated element 40, and a shaft 50.

The airtight container 20 is an example of a container. The airtight container 20 is equipped with a suction pipe 21 adapted to suck the refrigerant and a discharge pipe 22 adapted to discharge the refrigerant.

The compression element 30 is housed in airtight container 20. Specifically, the compression element 30 is installed in lower inner part of the airtight container 20. The compression element 30 compresses the refrigerant sucked by the suction pipe 21.

The electrically-operated element 40 is also housed in airtight container 20. Specifically, the electrically-operated element 40 is installed at that position in the airtight container 20 through which the refrigerant compressed by the compression element 30 passes before being discharged from the discharge pipe 22. That is, the electrically-operated element 40 is installed inside the airtight container 20 and above the compression element 30. The electrically-operated element 40 drives the compression element 30. The electrically-operated element 40 is a concentrated winding motor.

The refrigerating machine oil 60 configured to lubricate a sliding portion of the compression element 30 is accumulated at a bottom of the airtight container 20.

Details of the compression element 30 will be described below.

The compression element 30 includes a cylinder 31, a rolling piston 32, a vane (not shown), a main bearing 33, and a secondary bearing 34.

An outer circumference of the cylinder 31 is substantially circular in shape in planar view. A cylinder chamber, which is a space substantially circular in shape in planar view, is formed inside the cylinder 31. The cylinder 31 is open at opposite ends in an axial direction.

The cylinder 31 is provided with a vane groove (not shown) that extends radially, being communicated with the cylinder chamber. A back pressure chamber, which is a space shaped substantially circular in planar view and communicated with the vane groove is formed on an outer side of the vane groove.

The cylinder 31 is provided with a suction port (not shown) through which a gas refrigerant is sucked from the refrigerant circuits 11a and 11b. The suction port penetrates into the cylinder chamber from an outer circumferential surface of the cylinder 31.

The cylinder 31 is provided with a discharge port (not shown) through which compressed refrigerant is discharged from the cylinder chamber. The discharge port is formed by cutting out an upper end face of the cylinder 31.

The rolling piston 32 is ring-shaped. The rolling piston 32 performs eccentric motion in the cylinder chamber. The rolling piston 32 slidably fits over an eccentric shaft portion 51 of the shaft 50.

The vane is shaped as a flat substantially rectangular parallelepiped. The vane is installed in the vane groove of the cylinder 31. The vane is constantly pressed against the rolling piston 32 by a vane spring provided in the back pressure chamber. Because high pressure is maintained in the airtight container 20, when the compressor 12 starts operating, a force caused by a difference between pressure in the airtight container 20 and pressure in the cylinder chamber acts on a back surface (i.e., a surface facing the back pressure chamber) of the vane. Therefore, the vane spring is used to press the vane against the rolling piston 32 mainly during startup of the compressor 12 (when there is no difference between the pressures in the airtight container 20 and cylinder chamber).

The main bearing 33 is substantially inverse T-shaped when viewed from a side. The main bearing 33 slidably fits over a main shaft portion 52, which is that part of the shaft 50 that is located above the eccentric shaft portion 51. The main bearing 33 blocks upper part of the cylinder chamber and the vane groove of the cylinder 31.

The secondary bearing 34 is substantially T-shaped as viewed from a side. The secondary bearing 34 slidably fits over a secondary shaft portion 53, which is that part of the shaft 50 that is located below the eccentric shaft portion 51. The secondary bearing 34 blocks lower part of the cylinder chamber and the vane groove of the cylinder 31.

The main bearing 33 includes a discharge valve (not shown). A discharge muffler 35 is attached to an outer side of the main bearing 33. High-temperature, high pressure gas refrigerant discharged through the discharge valve enters the discharge muffler 35 once and then gets released into a space in the airtight container 20 from the discharge muffler 35. Note that the discharge valve and discharge muffler 35 may be provided on the secondary bearing 34 or on both main bearing 33 and secondary bearing 34.

Material of the cylinder 31, main bearing 33, and secondary bearing 34 is gray iron, sintered steel, carbon steel, or other steel. Material of the rolling piston 32 is alloy steel containing, for example, chromium or other metal. Material of the vane is, for example, high-speed tool steel.

A suction muffler 23 is provided on a side of the airtight container 20. The suction muffler 23 sucks low-pressure gas refrigerant from the refrigerant circuits 11a and 11b. When liquid refrigerant returns, the suction muffler 23 keeps the liquid refrigerant from getting directly into the cylinder chamber of the cylinder 31. The suction muffler 23 is connected to the suction port of the cylinder 31 through the suction pipe 21. A main body of the suction muffler 23 is fixed to a side face of the airtight container 20 by welding or another method.

Details of the electrically-operated element 40 will be described below.

According to the present embodiment, the electrically-operated element 40 is a brushless DC (Direct Current) motor. Note that the present embodiment is also applicable even if the electrically-operated element 40 is a motor (e.g., an induction motor) other than a brushless DC motor.

The electrically-operated element 40 includes a stator 41 and a rotor 42.

The stator 41 is fixed in abutment with an inner circumferential surface of the airtight container 20. The rotor 42 is installed inside the stator 41 with a gap about 0.3 to 1 mm in size provided therebetween.

The stator 41 includes a stator core 43 and a stator winding 44. The stator core 43 is produced by punching plural flat rolled magnetic steel sheets 0.1 to 1.5 mm in thickness into a predetermined shape, laminating the steel sheets in an axial direction, and fixing the steel sheets by calking, welding, or another method. The stator winding 44 is wound around the stator core 43 by concentrated winding via an insulating member 48. Material of the insulating member 48 is, for example, PET (polyethylene terephthalate), PBT (polybutylene terephthalate), FEP (tetrafluoroethylene hexafluoropropylene copolymer), PFA (tetrafluoroethylene perfluoroalkylvinylether copolymer), PTFE (polytetrafluoroethylene), LOP (liquid crystal polymer), PPS (polyphenylene sulfide), or phenol resin. The stator winding 44 is connected with lead wires 45.

Plural notches are formed at substantially equal intervals in a circumferential direction on an outer circumference of the stator core 43. Each of the notches serves as a passage for the gas refrigerant released from the discharge muffler 35 into the space in the airtight container 20. Each of the notches also serves as a passage for the refrigerating machine oil 60 returning to the bottom of the airtight container 20 from a top of the electrically-operated element 40.

The rotor 42 includes a rotor core 46 and permanent magnets (not shown). As with the stator core 43, the rotor core 46 is produced by punching plural flat rolled magnetic steel sheets 0.1 to 1.5 mm in thickness into a predetermined shape, laminating the steel sheets in an axial direction, and fixing the steel sheets by calking, welding, or another method. The permanent magnets are inserted into plural insertion holes formed in the rotor core 46. For example, ferrite magnets or rare earth magnets are used as the permanent magnets.

Plural through-holes are formed, penetrating the rotor core 46 substantially in the axial direction. As with the notches in the stator core 43, each of the through-holes serves as a passage for the gas refrigerant released from the discharge muffler 35 into the space in the airtight container 20.

A power supply terminal 24 (e.g., a glass terminal) for use to connect to an external power supply is attached to a top of the airtight container 20. The power supply terminal 24 is fixed to the airtight container 20, for example, by welding. The lead wires 45 from the electrically-operated element 40 are connected to the power supply terminal 24.

The discharge pipe 22 with opposite ends in the axial direction open is attached to the top of the airtight container 20. The gas refrigerant discharged from the compression element 30 is discharged from the space in the airtight container 20 to the refrigerant circuits 11a and 11b outside through the discharge pipe 22.

Operation of the compressor 12 will be described below.

Electric power is supplied from the power supply terminal 24 to the stator 41 of the electrically-operated element 40 via the lead wires 45. Consequently, the rotor 42 of the electrically-operated element 40 rotates. As the rotor 42 rotates, the shaft 50 fixed to the rotor 42 rotates. Along with rotation of the shaft 50, the rolling piston 32 of the compression element 30 rotates eccentrically in the cylinder chamber of the cylinder 31 of the compression element 30. Space between the cylinder 31 and rolling piston 32 is divided into two by the vane of the compression element 30. Volumes of the two spaces change with rotation of the shaft 50. One of the spaces increases in volume gradually, thereby sucking the refrigerant from the suction muffler 23. The other space decreases in volume gradually, thereby compressing the gas refrigerant in the space. The compressed gas refrigerant is discharged once into the space in the airtight container 20 through the discharge muffler 35. The discharged gas refrigerant passes through the electrically-operated element 40 and gets discharged out of the airtight container 20 through the discharge pipe 22 on top of the airtight container 20.

The refrigeration cycle apparatus 10 uses the high pressure shell compressor 12. That is, the refrigeration cycle apparatus 10 uses the compressor 12 in which temperature inside the airtight container 20 is elevated. Also, the refrigeration cycle apparatus 10 uses HFO-1123 as the refrigerant. Consequently, HFO-1123 can cause disproportionation reaction, raising concerns that a chain of disproportionation reactions might result in an explosion.

However, the refrigeration cycle apparatus 10 according to the present embodiment keeps down an amount of HFO-1123 in the refrigerant circuits 11a and 11b by using mixed refrigerant that contains less than 50 wt % of HFO-1123 in a state before the mixed refrigerant is enclosed in the refrigerant circuits 11a and 11b. The refrigeration cycle apparatus 10 can keep HFO-1123 from causing disproportionate reaction. Also, the refrigeration cycle apparatus 10 uses the refrigerating machine oil 60 prepared such that R32 will be least soluble therein. Consequently, a proportion of HFO-1123 in the mixed refrigerant can be kept from increasing even during operation of the refrigeration cycle apparatus 10. Therefore, the refrigeration cycle apparatus 10 according to the present embodiment can keep HFO-1123 from causing disproportionate reaction even during operation of the refrigeration cycle apparatus 10. Furthermore, in the mixed refrigerant used for the refrigeration cycle apparatus 10 according to the present invention a mixing ratio of R32 is set between 0.7 times and two times (both inclusive) that of HFO-1123 in terms of weight ratio. Consequently, R32 and HFO-1123 can be brought into a pseudo-azeotropic state. Thus, the refrigeration cycle apparatus 10 according to the present embodiment, can inhibit separation between R32 and HFO-1123, and thereby further inhibit disproportionation reaction of HFO-1123. That is, the refrigeration cycle apparatus 10 according to the present embodiment can prevent explosions caused by a chain of disproportionation reactions of HFO-1123 and ensure high safety even when HFO-1123 is used.

Note that when the effect of reducing global warming potential (GWP) by use of HFO-1123 is considered, preferably the ratio of HFO-1123 in the mixed refrigerant is 10 wt % or above.

Also, to reduce the proportion of HFO-1123 in the mixed refrigerant the refrigeration cycle apparatus 10 according to the present embodiment, mixes not only R32, but also HFO-1234yf. This makes it possible to reduce the GWP of the mixed refrigerant as well.

Now, an example of a composition ratio of mixed refrigerant and an example of an amount of refrigerant dissolved in the refrigerating machine oil 60 will be introduced.

Figure 4:
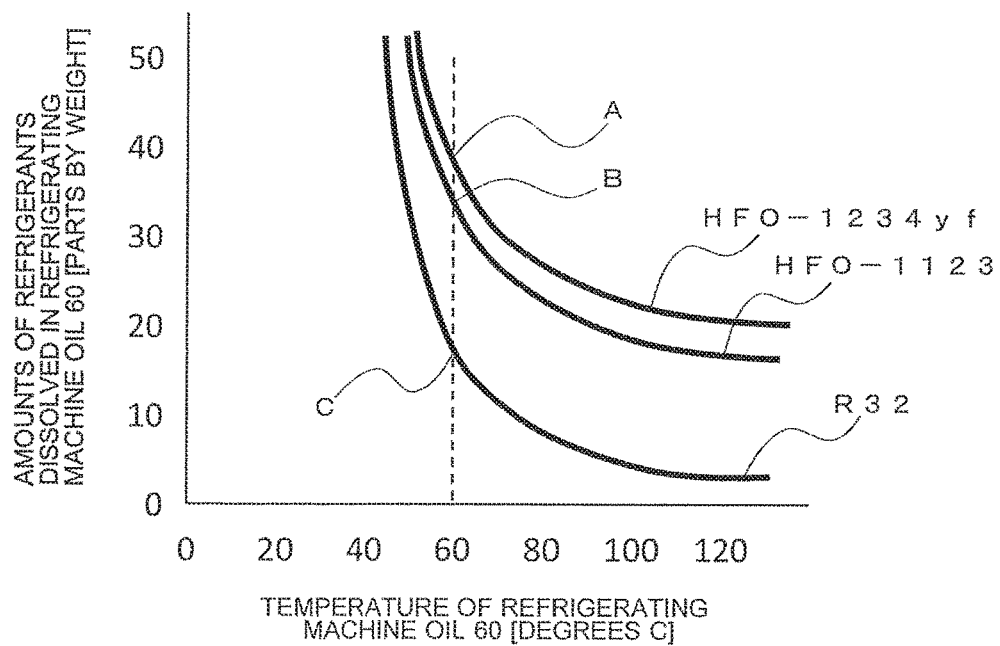
FIG. 4 is a diagram showing amounts of refrigerants dissolved in refrigerating machine oil 60 according to the embodiment of the present invention.
Figure 5:
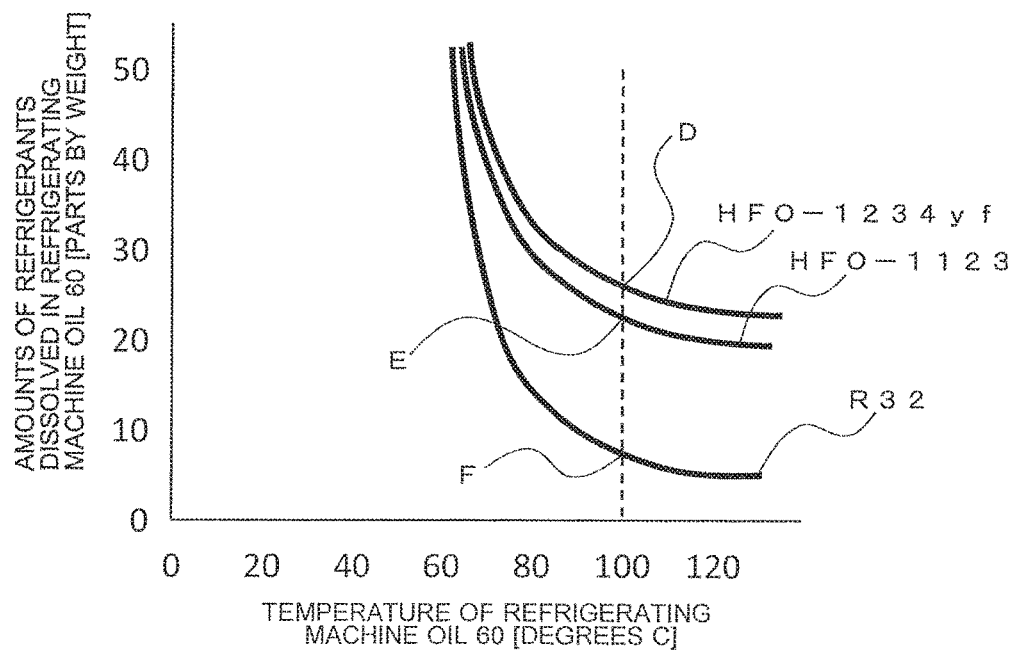
FIG. 5 is a diagram showing amounts of refrigerants dissolved in the refrigerating machine oil 60 according to the embodiment of the present invention.

FIGS. 4 and 5 are diagrams showing amounts of refrigerants dissolved in the refrigerating machine oil 60 according to the embodiment of the present invention, where FIG. 4 shows dissolved amounts of refrigerants during normal operation while FIG. 5 shows dissolved amounts of refrigerants during overload operation. Also, in FIGS. 4 and 5, in a state before the mixed refrigerant is enclosed in the refrigerant circuits, composition of the mixed refrigerant is as follows in terms of weight ratio: HFO-1123:R32:HFO-1234yf=40:40:20. Note that the ordinate shown in FIGS. 4 and 5 represents the amounts of soluble HFO-1123 and R32 per 100 parts by weight of the refrigerating machine oil 60.

As shown in FIGS. 4 and 5, the amounts of refrigerants (the refrigerants making up the mixed refrigerant) dissolved in the refrigerating machine oil 60 satisfy the following relationship: HFO-1234yf >HFO-1123>R32. When attention is focused on conditions in which temperature of the refrigerating machine oil 60 during normal operation is 60 degrees C. (position of the broken line in FIG. 4), if the refrigeration cycle apparatus 10 is operating under these conditions, dew point temperature of the mixed refrigerant is 40 degrees C. and temperature of the refrigerating machine oil 60 accumulated in the compressor 12 is 60 degrees C. (in other words, a degree of superheat of discharge from the compressor 12 is 20 degrees C.). Under these operating conditions, the dissolved amount of HFO-1234yf is 38 parts by weight (point A) and the dissolved amount of HFO-1123 is 33 parts by weight (point B). Also, the dissolved amount of R32 is 17 parts by weight, which is 21 parts less than the dissolved amount of HFO-1234yf.

That is, by adjusting the amounts of refrigerants (the refrigerants making up the mixed refrigerant) dissolved in the refrigerating machine oil 60 in such a way as to satisfy the relationship of HFO-1234yf>HFO-1123>R32, it is possible to reduce the proportion of HFO-1234yf in the mixed refrigerant circulating in the refrigerant circuits 11a and 11b. This increases pressure of the mixed refrigerant and thereby decreases a temperature glide of the mixed refrigerant in a condensation process and an evaporation process, making it possible to improve performance (COP) of the refrigeration cycle apparatus 10.

Also, if the amounts of refrigerants (the refrigerants making up the mixed refrigerant) dissolved in the refrigerating machine oil 60 is prepared so as to satisfy the relationship of HFO-1234yf>HFO-1123>R32, during operation of the refrigeration cycle apparatus 10, the proportion of HFO-1234yf in the mixed refrigerant circulating in the refrigerant circuits 11a and 11b does not exceed the proportion at the time of enclosure of the mixed refrigerant in the refrigerant circuits 11a and 11 b. Thus, the performance of refrigeration cycle apparatus 10 does not degrade.

On the other hand, when attention is focused on conditions in which temperature of the refrigerating machine oil 60 during overload operation is 60 degrees C. (position of the broken line in FIG. 5), if the refrigeration cycle apparatus 10 is operating under these conditions, the dew point temperature of the mixed refrigerant is 60 degrees C. and the temperature of the refrigerating machine oil 60 accumulated in the compressor 12 is 100 degrees C. (in other words, the degree of superheat of discharge from the compressor 12 is 40 degrees C.). Under these operating conditions, the dissolved amount of HFO-1234yf is 26 parts by weight (point D) and the dissolved amount of HFO-1123 is 22 parts by weight (point E). Also, the dissolved amount of R32 is 7 parts by weight, which is 19 parts by weight less than the dissolved amount of HFO-1234yf.

The higher the refrigerant temperature, the less soluble the refrigerant is in the refrigerating machine oil 60. That is, during overload operation in which the refrigerant temperature is higher than during normal operation, the amount of refrigerant dissolved in the refrigerating machine oil 60 is smaller than during normal operation. Consequently, the proportion of HFO-1234yf in the mixed refrigerant circulating in the refrigerant circuits 11a and 11b during overload operation is higher than during normal operation. Because HFO-1234yf involves a low operating pressure, by adjusting the amounts of refrigerants (the refrigerants making up the mixed refrigerant) dissolved in the refrigerating machine oil 60 so as to satisfy the relationship of HFO-1234yf>HFO-1123>R32, it is also possible to achieve the effect of reducing refrigerant pressure on a high-pressure side during overload operation.

Figure 6:
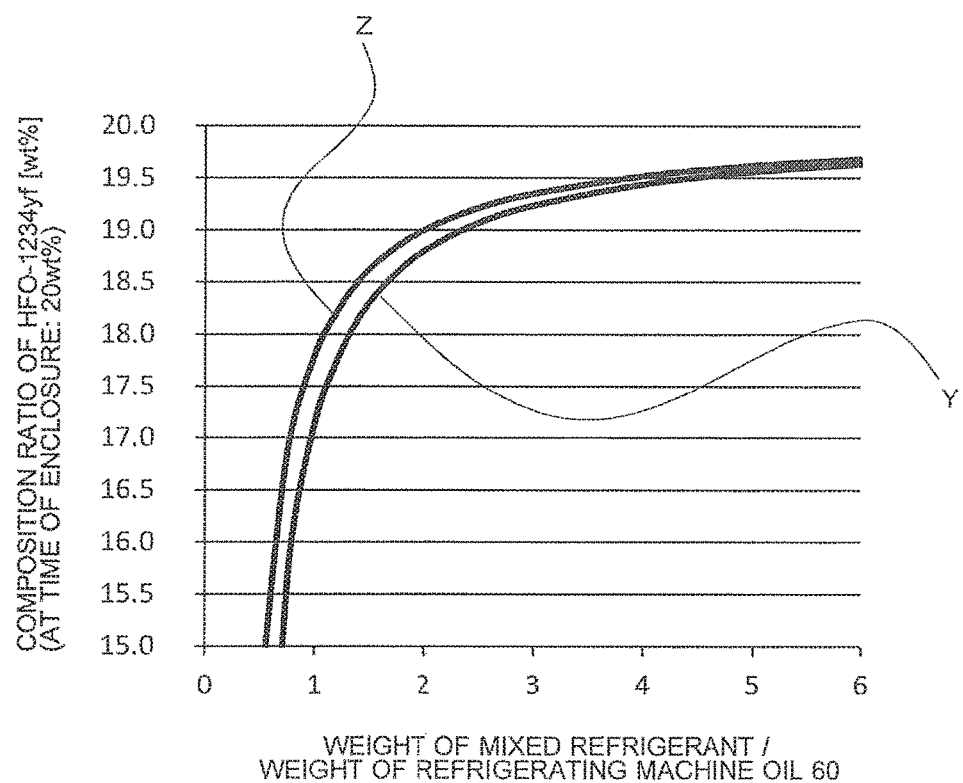
FIG. 6 is a diagram showing a composition ratio of HFO-1234yf when refrigerants making up a mixed refrigerant are dissolved in the refrigerating machine oil 60 at ratios shown in FIGS. 4 and 5.

FIG. 6 is a diagram showing a composition ratio of HFO-1234yf when refrigerants making up a mixed refrigerant are dissolved in the refrigerating machine oil 60 at ratios shown in FIGS. 4 and 5. The abscissa in FIG. 6 represents the weight ratio of the mixed refrigerant and refrigerating machine oil 60 before the mixed refrigerant is enclosed in the refrigerant circuits 11a and 11b (weight of the mixed refrigerant/weight of the refrigerating machine oil 60). Also, the ordinate in FIG. 6 represents the proportion of HFO-1234yf in the mixed refrigerant circulating in the refrigerant circuits 11a and 11b. Note that curve Y represents the composition ratio of HFO-124yf during normal operation while curve Z represents the composition ratio of HFO-1234yf during overload operation.

When the mixed refrigerant and refrigerating machine oil 60 are enclosed in the refrigerant circuits 11a and 11b such that a weight ratio of the mixed refrigerant will be equal to or less than the refrigerating machine oil 60, the ratio of the mixed refrigerant to the refrigerating machine oil 60 is so low that an amount of change in the composition of the mixed refrigerant becomes too large, which makes the composition of the mixed refrigerant unstable and thereby makes it difficult to control the refrigeration cycle apparatus 10. On the other hand, if the mixed refrigerant and refrigerating machine oil 60 are enclosed in the refrigerant circuits 11a and 11b such that the weight ratio of the mixed refrigerant will be four times or more the refrigerating machine oil 60, the ratio of the mixed refrigerant to the refrigerating machine oil 60 is so high that an amount of change in HFO-1234yf becomes as small as 0.5 wt %. This decreases the COP improvement effect and high-pressure reduction effect described above. According to the present embodiment, since the mixed refrigerant and refrigerating machine oil 60 are enclosed in the refrigerant circuits 11a and 11b such that the mixed refrigerant will be between one and four times (both inclusive) the refrigerating machine oil 60 in terms of weight ratio, the refrigeration cycle apparatus 10 can be controlled stably, making it possible to achieve a sufficient COP improvement effect and high-pressure reduction effect.

Note that the composition of the mixed refrigerant (HFO-1123:R32:HFO-1234yf=40:40:20) in a state before the mixed refrigerant is enclosed in the refrigerant circuits is strictly exemplary. However, if the ratio of HFO-1234yf increases too much, there is concern that an increased pressure loss may degrade the performance of the refrigeration cycle apparatus 10. Thus, preferably the ratio of HFO-1234yf is 50 wt % or less.

Besides, the dissolved amounts of refrigerants shown in FIGS. 4 and 5 are also strictly exemplary. Under operating conditions in which the dew point temperature is 40 degrees C. and the temperature of the refrigerating machine oil 60 accumulated in the compressor 12 is 60 degrees C., by adjusting the refrigerating machine oil 60 such that the dissolved amount of HFO-1234yf will be 30 parts or above by weight, and that the dissolved amount of R32 will be 10 parts or more by weight less than the dissolved amount of HFO-1234yf, the effects described above can be achieved sufficiently.

An embodiment of the present invention has been described above, but the embodiment may be implemented partially. For example, one or some of the elements denoted by symbols in the drawings may be omitted or replaced by other elements. Note that the present invention is not limited to the above embodiment, and various changes may be made as required.

Reference Signs List 10 refrigeration cycle apparatus
11a, 11b refrigerant circuit
12 compressor
13 four-way valve
14 outdoor heat exchanger
15 expansion valve
16 indoor heat exchanger
17 controller
20 airtight container
21 suction pipe
22 discharge pipe
23 suction muffler
24 power supply terminal
30 compression element
31 cylinder
32 rolling piston
33 main bearing
34 secondary bearing
35 discharge muffler
40 electrically-operated element
41 stator
42 rotor
43 stator core
44 stator winding
45 lead wire
46 rotor core
48 insulating member
50 shaft
51 eccentric shaft portion
52 main shaft portion
53 secondary shaft portion
60 refrigerating machine oil

The invention claimed is:

1. A refrigeration cycle apparatus comprising:
a refrigerant circuit in which a high-pressure shell compressor, a condenser, an expansion mechanism and an evaporator are connected;
a mixed refrigerant circulating through the refrigerant circuit and containing 1,1,2-trifluoroethylene, difluoromethane and 2,3,3,3-tetrafluoropropene mixed with each other,
wherein, in a state prior to introduction of the mixed refrigerant into the refrigerant circuit, a percentage by weight of the 1,1,2-trifluoroethylene is contained in the mixed refrigerant in an amount less than 50 wt %, and a percentage by weight of the difluoromethane is contained in an amount of at least 0.7 times but not more than two times the percentage by weight of the 1,1,2-trifluoroethylene in terms of weight ratio; and
a refrigerating machine oil is enclosed in the refrigerant circuit together with the mixed refrigerant in an amount equal to and up to four times the weight of the mixed refrigerant in terms of weight ratio, the refrigerating machine oil being a solvent for the mixed refrigerant with a portion of each of the difluoromethane, the 1,1,2-trifluoroethylene and the 2,3,3,3-tetrafluoropropene being dissolved in the refrigerating machine oil enclosed in the refrigerant circuit,
wherein the refrigerating machine oil satisfies a relationship that the difluoromethane has a smaller solubility in the refrigerating machine oil compared to solubilities of the 1,1,2-trifluoroethylene and the 2,3,3,3-tetrafluoropropene in the refrigerating machine oil, and the refrigerating machine oil reduces the amount of the 1,1,2-trifluoroethylene contained in the mixed refrigerant enclosed in the refrigerant circuit for inhibiting a disproportionation reaction of the 1,1,2-trifluoroethylene during operation of the refrigeration cycle apparatus.

2. The refrigeration cycle apparatus of claim 1, wherein the refrigerating machine oil satisfies another relationship that the 2,3,3,3-tetrafluoropropene is more soluble in the refrigerating machine oil than the 1,1,2-trifluoroethylene.

3. The refrigeration cycle apparatus of claim 1, wherein under operating conditions in which a dew point temperature is 40 degrees C. and a temperature of the refrigerating machine oil accumulated in the high-pressure shell compressor is 60 degrees C.:
30 parts by weight or more of the 2,3,3,3-tetrafluoropropene is dissolved in the refrigerating machine oil per 100 parts by weight of the refrigerating machine oil; and
an amount of the difluoromethane dissolved in the refrigerating machine oil per 100 parts by weight of the refrigerating machine oil is less than the dissolved amount of the 2,3,3,3-tetrafluoropropene by 10 parts by weight or more.

4. The refrigeration cycle apparatus of claim 1, wherein the refrigerating machine oil comprises at least one of polyol ester, polyvinyl ether, and polyalkylene glycol.

5. The refrigeration cycle apparatus of claim 1, wherein during operation of the refrigeration cycle apparatus, the refrigerating machine oil prevents an increase in a weight amount of the 1,1,2-trifluoroethylene dissolved in the mixed refrigerant enclosed in the refrigeration circuit compared to the weight amount of the 1,1,2-trifluoroethylene in the mixed refrigerant in the state prior to introduction into the refrigerant circuit for inhibiting the disproportionation reaction of the 1,1,2-trifluoroethylene.

6. The refrigeration cycle apparatus of claim 1, wherein during operation of the refrigeration cycle apparatus, the refrigerating machine oil dissolves different amounts of the difluoromethane, 1,1,2-trifluoroethylene and the 2,3,3,3-tetrafluoropropene, resulting in the mixed refrigerant enclosed in the refrigeration circuit having a weight amount of 2,3,3,3-tetrafluoropropene greater than a weight amount of 1,1,2-trifluoroethylene and a weight amount of 1,1,2-trifluoroethylene being greater than the weight amount of difluoromethane.

7. The refrigeration cycle apparatus of claim 1, wherein the weight of the refrigerating machine oil is greater than the weight of the mixed refrigerant and up to four times the weight of the mixed refrigerant in terms of weight ratio.

8. The refrigeration cycle apparatus of claim 1, wherein the refrigerating machine oil comprises at least one of a polyol ester, a polyvinyl ether, and a polyalkylene glycol, and the polyol ester is a product of esterification of a fatty acid and polyhydric alcohol, and the solubility of each refrigerant in the polyol ester is adjusted by varying a carbon number of the fatty acid, selecting a molecular structure of the fatty acid from a branch-chain fatty acid and an unbranched (straight-chain) fatty acid, varying a carbon number of the polyhydric alcohol, and selecting a molecular structure of the polyhydric alcohol from a branched-chain polyhydric alcohol and an unbranched (straight-chain) polyhydric alcohol, the polyvinyl ether is a compound in which alkyl groups are linked to side chains of a straight-chain hydrocarbon via ether linkages, and the solubility of each refrigerant in the polyvinyl ether is adjusted by varying components of the alkyl group linked to the side chains via ether linkages, and polyalkylene glycol is a compound in which a propylene oxide and ethylene oxide are linked together in chains via ether linkages, and the solubility of each refrigerant in the polyethylene glycol is adjusted by varying a ratio between the propylene oxide and ethylene oxide.

9. A refrigeration cycle apparatus comprising:

a refrigerant circuit in which a high-pressure shell compressor, a condenser, an expansion mechanism and an evaporator are connected;

a mixed refrigerant circulating through the refrigerant circuit and containing 1,1,2-trifluoroethylene, difluoromethane and 2,3,3,3-tetrafluoropropene mixed with each other; and a refrigerating machine oil is enclosed in within the refrigerant circuit combined with the mixed refrigerant, the mixed refrigerant being in contact with the refrigerating machine oil while circulating through the refrigerant circuit, an amount of the refrigerating machine oil being equal to a weight of the mixed refrigerant and up to four times the weight of the mixed refrigerant in terms of weight ratio, wherein, in an unenclosed state of the mixed refrigerant which is prior to introducing the mixed refrigerant into the refrigerant circuit and combining the mixed refrigerant with our refrigerating machine oil, the 1,1,2-trifluoroethylene is contained in the mixed refrigerant in an amount less than 50 wt %, and the difluoromethane is contained in the mixed refrigerant in an amount of at least 0.7 times but not more than two times an amount of the 1,1,2-trifluoroethylene in terms of weight ratio of the 1,1,2-trifluoroethylene to the difluoromethane, and a weight ratio of the difluoromethane to a total weight of the mixed refrigerant being based on the amount of 1,1,2-trifluoroethylene and the weight ratio of the 1,1,2-trifluoroethylene to the difluoromethane, and wherein, in an enclosed state of the mixed refrigerant where the mixed refrigerant is combined with the refrigerating machine oil and enclosed in the refrigerant circuit, the weight ratio of the difluoromethane to the total weight of the mixed refrigerant is larger than the weight ratio of the difluoromethane to the total weight of the mixed refrigerant in the unenclosed state of the mixed refrigerant.

10. The refrigeration cycle apparatus of claim 9, wherein the refrigerating machine oil satisfies a relationship that the 2,3,3,3-tetrafluoropropene is more soluble in the refrigerating machine oil than the 1,1,2-trifluoroethylene.

11. The refrigeration cycle apparatus of claim 9, wherein under operating conditions in which a dew point temperature is 40 degrees C. and a temperature of the refrigerating machine oil accumulated in the high-pressure shell compressor is 60 degrees C.:

30 parts by weight or more of the 2,3,3,3-tetrafluoropropene is dissolved in the refrigerating machine oil per 100 parts by weight of the refrigerating machine oil; and an amount of the difluoromethane dissolved in the refrigerating machine oil per 100 parts by weight of the refrigerating machine oil is less than the dissolved amount of the 2,3,3,3-tetrafluoropropene by 10 parts by weight or more.

12. The refrigeration cycle apparatus of claim 9, wherein the refrigerating machine oil comprises at least one of polyol ester, polyvinyl ether, and polyalkylene glycol.

13. The refrigeration cycle apparatus of claim 9, wherein the refrigerating machine oil has a molecular structure in which an increased weight amount of the 1,1,2-trifluoroethylene is dissolved into the refrigerating machine oil relative to dissolved amounts of difluoromethane and the 1,1,2-trifluoroethylene for inhibiting the disproportionation reaction of the 1,1,2-trifluoroethylene.

14. The refrigeration cycle apparatus of claim 9, wherein the refrigerating machine oil has a molecular structure so that different amounts of the difluoromethane, 1,1,2-trifluoroethylene and the 2,3,3,3-tetrafluoropropene dissolve in the mixed refrigerant which results in the weight amount of 2,3,3,3-tetrafluoropropene being greater than the weight amount of 1,1,2-trifluoroethylene and the weight amount of 1,1,2-trifluoroethylene being greater than the weight amount of difluoromethane which relationship inhibits the disproportionation reaction of the 1,1,2-trifluoroethylene.

15. The refrigeration cycle apparatus of claim 9, wherein the weight of the refrigerating machine oil is greater than the weight of the mixed refrigerant and up to four times the weight of the mixed refrigerant in terms of weight ratio.

16. The refrigeration cycle apparatus of claim 9, wherein
the refrigerating machine oil comprises at least one of a polyol ester, a polyvinyl ether, and a polyalkylene glycol, and the polyol ester is a product of esterification of a fatty acid and polyhydric alcohol, and the solubility of each refrigerant in the polyol ester is adjusted by varying a carbon number of the fatty acid, selecting a molecular structure of the fatty acid from a branch-chain fatty acid and an unbranched (straight-chain) fatty acid, varying a carbon number of the polyhydric alcohol, and selecting a molecular structure of the polyhydric alcohol from a branched-chain polyhydric alcohol and an unbranched (straight-chain) polyhydric alcohol, the polyvinyl ether is a compound in which alkyl groups are linked to side chains of a straight-chain hydrocarbon via ether linkages, and the solubility of each refrigerant in the polyvinyl ether is adjusted by varying components of the alkyl group linked to the side chains via ether linkages, and polyalkylene glycol is a compound in which a propylene oxide and ethylene oxide are linked together in chains via ether linkages, and the solubility of each refrigerant in the polyethylene glycol is adjusted by varying a ratio between the propylene oxide and ethylene oxide.

* * * * *